March 24, 1953 — C. E. HOCKERT — 2,632,544
TWO-SPEED FRICTION CLUTCH DRIVE
Filed Aug. 22, 1947 — 2 SHEETS—SHEET 1
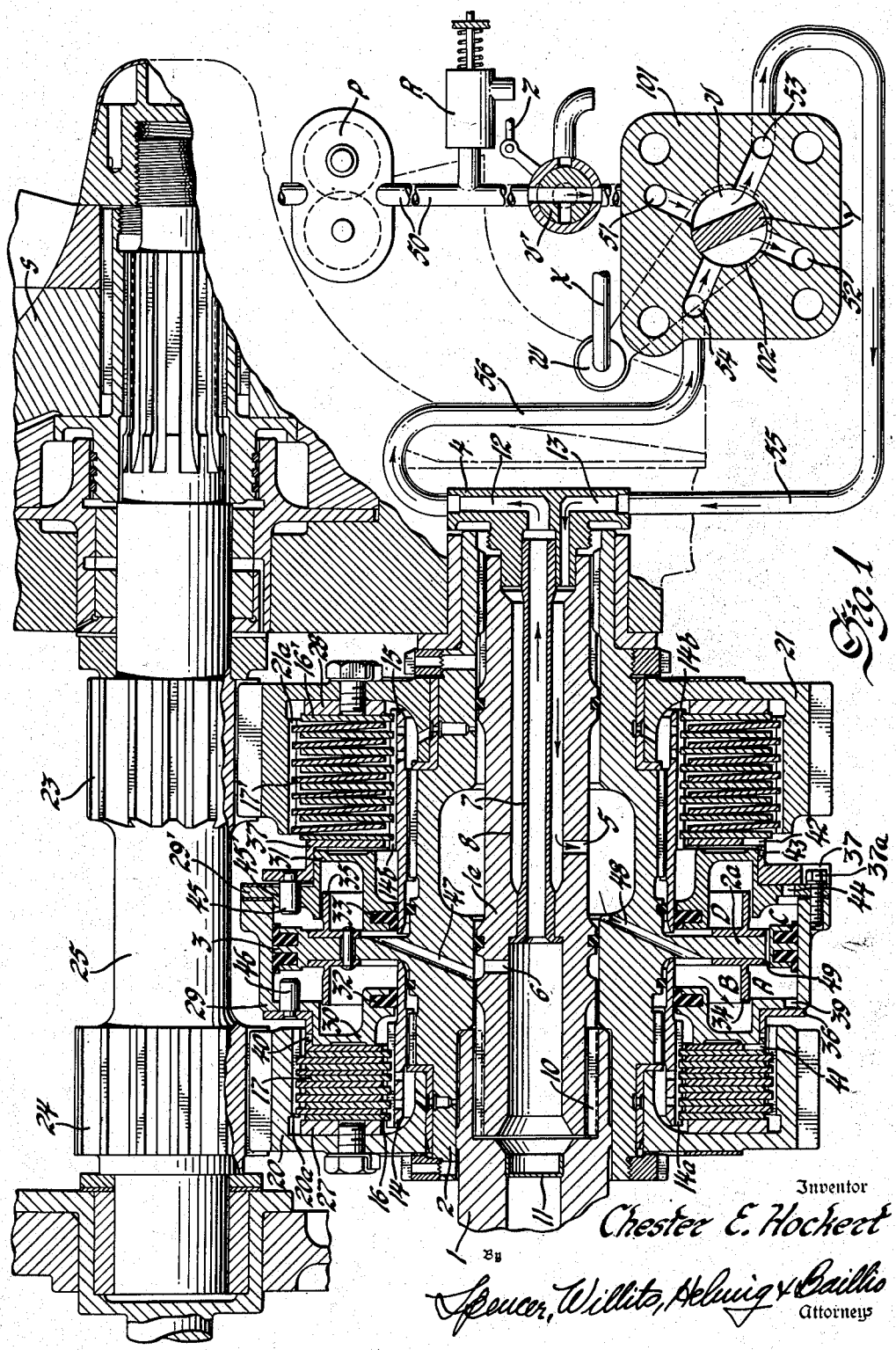
Inventor
Chester E. Hockert
By
Spencer, Willits, Helwig & Baillio
Attorneys

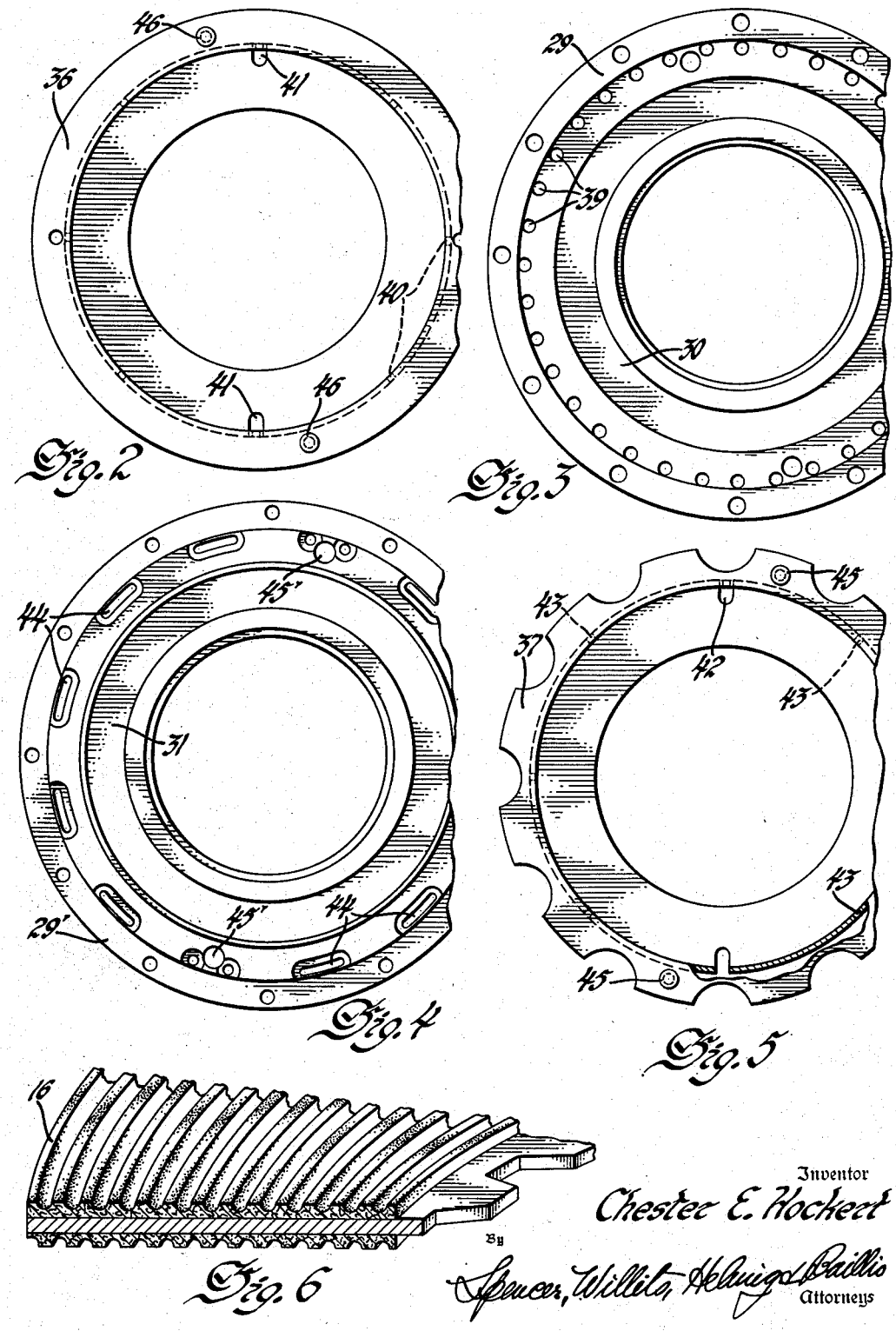

Patented Mar. 24, 1953

2,632,544

UNITED STATES PATENT OFFICE 2,632,544

TWO-SPEED FRICTION CLUTCH DRIVE

Chester E. Hockert, Indianapolis, Ind., assignor to General Motors Corporation, Detroit, Mich., a corporation of Delaware Application August 22, 1947, Serial No. 770,075

11 Claims. (Cl. 192—87)

The present invention pertains to variable speed ratio driving systems in which speed ratio changes are effected by friction clutches running in oil or operating under controlled oil bath conditions and by fluid pressure actuation of such clutches.

It is particularly adapted to the drive of high speed devices such as aircraft engine superchargers or blowers, but it may also be applied to other drive problems involving fluid pressure actuation and high speed operation.

An object of the invention is to provide a selective friction clutch drive, fluid pressure actuated, in which the clutch-actuating fluid pressure follows a divided path during a clutch load-relieving interval, one portion of the oil body being circulated and relieved with the aid of centrifugal force separately from the other portion.

A further object is to provide fluid pressure relief-controlling means which shall be subject to the degree of motion of a clutch actuating member, and by the result of such motion, segregate a portion of an oil body for sludge relief thereof.

An additional object is to divide the fluid pressure actuator spaces into two chambers having a restriction passage between them, for providing a timing delay in the actuation interval of a friction clutch.

Another object is to provide means for constant flushing of the clutch actuator cylinder spaces, and for accelerated flushing action during the speed ratio change intervals.

Accumulations of sludge in high speed power transmission devices are due to the physical fact that practically all oil sludges have greater specific gravity than that of the included oil body, and consequently the sludge will respond to centrifugal force, tending to accumulate in external radial portions of the mechanisms.

The present invention provides means for accumulating such sludge during a clutch load-sustaining interval and ejecting it during the clutch load-relieving interval, and it provides especially for partial shutting off the clutch cylinder space so as to segregate the outer radial oil body portion, preparatory to the final ejection of that portion thru apertures in the outward radial zone.

In closed-end clutch cylinders from which the whole of the actuating oil body must flow back thru the same passages by which it has entered, the rate at which sludge will accumulate is often so high as to make practical application to certain heavy duty, high-speed uses, impossible. Consequently, blind-end systems in drives operating at high speeds such as for aircraft engine blowers or superchargers, cannot be used without excessively elaborate, constantly running filter systems to remove sludge accumulations, which have not been practically successful.

These difficulties are well known to aircraft engineers and technicians, and have resulted in seriously limiting the effective "hours-in-use" factor, necessitating frequent power plant disassembly for cleaning, and occasionally causing power failure in the air.

The present invention therefore is directed to extension of "hours-in-use" by making it possible for the clutch drive system to be continuously self-cleaning. In using the term "continuously" this reference is, of course, directed to the practical use of a clutch drive in which reasonably frequent speed ratio changes are made, since the device here presented operates to remove a portion of the clutch-actuating oil body from one centrifuge zone of the clutch actuating mechanism, with each change of drive speed ratio.

The oil body so ejected is then returned to the low pressure reservoir or sump for filtering by common means, for cooling and for recirculation by the pumping system.

Further objects, advantages and useful results will appear in the following specification in conjunction with the appended drawings, in which:

Fig. 1 is a longitudinal section of an embodiment of the invention applied to the drive of an aircraft supercharger device, including a schematic fluid pressure actuation and control system.

Fig. 2 is a plane view of the sludge-valve plate at the left of Fig. 1, and Fig. 3 is a similar view of the web portion of the cylinder 29 adjacent thereto.

Fig. 4 is a plane view of the web portion of cylinder 29 at the right of Fig. 1, and Fig. 5 is a similar view of the sludge-valve plate adjacent thereto. Fig. 5 is partially sectioned to show the distribution of the vent holes. Fig. 6 is a perspective view of a portion of one of the composite driving clutch plates of Fig. 1, showing the spiral channeling thereof in detail, and the inner circumferential spline teeth.

In the example of the invention given in Fig. 1 the hollow driving shaft 1 connected to the engine is supported in the drive casing by customary bearings (not shown) and is splined to drive hub member 2 thru quill-shaft 1e. A web 2a of member 2 extends radially to form an axially fixed piston 3.

The right end of shaft section 1e is equipped with a non-rotating gland cap 4, drilled as shown for feed passages.

The shaft 1e is radially drilled at 5 and 6 for clutch cylinder feed. Tube 7 fits inside the bore 8 of shaft 1e so that its inner space communicates with radial passages 6, and its outer space with passages 5.

The bore 8 of shaft 1a is closed by seal plug 11 at the left, leakage from this space serving to provide lubrication thru the adjacent splining 10.

The gland passage 12 connects to the inner space of tube 7, and the passage 13 connects to the outer space, as shown in Fig. 1.

Clutch drums 14 and 15 are splined internally to member 2, and toothed externally to drive sets of clutch plates 16 and 16' such as shown in planar view in Fig. 6.

The fluid passages involved in the low speed clutch actuation are 13, outer space of tube 7, in bore 8, drilling 5 and passage 48, those for the high speed clutch being 12, inner space of tube 7, drilling 6 and passage 47.

The output gearing of the clutch assembly consists of two gear bodies 20 and 21, mounted to rotate on extensions of member 2, and supported against axial thrust. The low speed gearbody 20 is externally toothed to mesh with gear 24 of blower shaft 25, and is internally toothed at 20a to receive the torque of clutch plates 17 interleaved with plates 16 of drum 14. Similarly, gearbody 21 is externally toothed to drive gear 23 of blower shaft 25, and is toothed internally at 21a for clutch driven plates 17' interleaved with plates 16' of drum 15.

Replaceable end plates 27 and 28 are bolted to the radial webs of gearbodies 20 and 21 to provide stack backing means for the torque capacity loading of the clutch plates.

A central, double-cylinder member 29 encircles the fixed piston 3 and is extended inward radially at each end to form pressure applying webs 30 and 31 and seal collars 32 and 33. Member 29 is of composite or split construction to facilitate assembly, with webs as in Figs. 3 and 4.

The web 2a supporting piston 3 is fitted with two ring-shaped collars 34 and 35 extending axially therefrom. The collar 34 fits loosely inside the axial extension of member 29, and divides the low speed cylinder space to the left of web 2a into two outer and inner spaces, A and B, respectively.

A spacer piece 36 formed as shown in the Fig. 1 section has a radial portion lying between the adjacent radial portion of cylinder 29 and the clutch plate stack 16, 17 at the left.

Similarly, collar 35 fits loosely inside the axial portion of slidable cylinder 29 at the right, dividing the high speed clutch cylinder space into two spaces, inner and outer, C and D respectively.

A similar spacer piece 37 has a radial portion lying between the adjacent radial portion of cylinder 29 and the clutch plate stack 16', 17' at the right, 36, 37 being drilled for back pressure relief.

The spacer piece 36 is used as a sludge-ridding valve and for that purpose is drilled radially at points 40 around the circumference at a radial distance corresponding to the external portion of the clutch stack. A number of slots such as indicated at 41, are cut in the piece 36 on the diameter shown. These are shown in Fig. 2.

The external radial flange of piece 36 is ground and lapped to fit tightly against the adjacent face of cylinder 29, which face is also lapped to form an axial valve seat. The low speed face of cylinder 29 is multiple-drilled on the circumference indicated, indicated by numeral 39.

In practice this lapped seat is made to hold 100 p. s. i., with a maximum permitted leakage of 10 cc. per minute.

The high speed clutch spacer piece 37 is similarly used as a sludge-ridding valve in coaction with the adjacent face of slidable cylinder 29, and is slotted at the points 42 indicated, and may be multiple-drilled on a circumference at the radial distance shown, at points 43. This seat is also lapped. Piece 37 is shown in plane view in Fig. 5.

The adjacent portion of the cylinder 29' is drilled at points 45' and slotted at points 44. The piece 37 is guided on pins 45 fitted into registry holes 45' in the adjacent face of cylinder 29'.

Valve plates 36 and 37 are drilled at 40 and 43 respectively, as back pressure relief holes for any oil which may accumulate between the plates 36, 37 and cylinder 29. These holes are not absolutely essential, since the slots 41 and 42 also serve this purpose. The holes 40 and 43 may be omitted; since they do not concern the action of the valve plates in closing or opening the ports to the spaces A and C, as will be further understood in detail. Holes 45' in plate 29' act as guides for pins 45. The cupped out portion of member 37 shown at the bottom of Fig. 1 permits the latter to move freely axially without interference with bolt heads 37a required to fasten 29 and 29' together. Pins 45 maintain correct angular alignment of plate 37 with respect to cylinder 29', the valve plate 37 overlapping hole 44 as shown in Fig. 1.

The piece 36 is guided on similar pins 46, to maintain angular registry and retain the lapped seat fitting.

The supercharger driven by shaft 25 is indicated at S in Fig. 1.

Valve body 101 which may be mounted conveniently for operator control is connected by pipes 55 and 56 to the gland 4, and passages 13 and 12 respectively; is connected from port 52 to the fluid system exhaust reservoir, and is connected at port 51 to passage 50 leading from the pump P.

It should be understood that the lower right hand portion of Fig. 1 is schematic, and that the valves V and V', with the valve body 101 may be placed or built-in wherever convenience requires. For example, the whole assembly may be directly incorporated in the engine or supercharger casings with the external controls such as rod X or rod Z leading to the pilot's compartment thru appropriate linkages.

The outline of item R is to enclose a common line-pressure regulator valve which assures that there will be available fluid servo pressures when the drive speed of pump P is above a given minimum.

In the case where the various elements are built in, the gland 4 may become a part of the casing, along with valve body 101 and the piping 55, 56, 50 and 51 would then be drilled passages therein with the exhaust outlets leading to the sump.

The 2-piece cylinder 29 has two webs 30 and 31 bolted together. Its travel is so designed with respect to the axial compression factor of the two clutches and the width of piston 3, that simultaneous engagement of the two ratios is impossible. Right portion 29' is bolted to cylinder 29.

The web 2a is equipped with the two collars having a measured diametral clearance with the cylindrical bores of the traveler piston 29, and the collars 36, 37 act as timing delay valves between the inner and outer spaces B, A and D, C. When oil under pressure is fed to space D, the oil pressure is not felt in space C until the cylinder 29 has moved to the right so as to press against the valve plate 37, which upon shifting closes the orifices 44 on the web 31 of piston 29'. While the high speed clutch cylinder spaces C and D are filling with oil, the low speed spaces A and B are being emptied. The greater volume of oil in space B drains back to valve V and exhausts thru port 52, the remainder and that in space A escaping thru the orifices in the cylinder 29, after the sludge valve plate 36 unseats from the left face of 29. The plate 36 is unseated by a further lack of pressure behind it, and by the action of resilience of the clutch plates 17. The relief of fluid pressure on the plates 16, 17 permits the coned plates 17 to act as self-loaded disc springs. This latter body of oil is flung free with considerable kinetic force and at high velocity, carrying with it any sludge which may have accumulated in space A.

An additional feature is provided for assisting the starting of the ratio shift, consisting of a bleed hole 49 connecting spaces A and C thru the web 2a. When shifting from "low" to "high" oil under pressure is built up in space D but cannot take effect immediately in space C because of the restriction of the interconnection by collar 35 acting as a delay valve. For example, both of the spaces A and B contain oil at the start of the shift from "low" to "high," but the pressure in space D must be great enough to overcome that in spaces A and B before the cylinder 29 actually moves to the right. Furthermore, the oil in space A cannot escape thru the holes 39 by the member 29 until the shift action has actually started. The bleed hole thereupon relieves the pressure from space A to space C which permits this action to begin. After this shift is completed a given small quantity of oil bleeds constantly from space C to space A and exhausts thru the holes, this flow serving to flush the space A.

An identical action takes place during the shift from "high" to "low," the bleed hole serving to initiate the shift action by cross-connecting A and C, while feeding flushing oil to space C during drive in "low," in the same manner.

It is not readily understood that systems such as described here are distinctly of dynamic flow type rather than of static head type, therefore the present description emphasizes the particular useful results deriving from features as just above described, to show clearly wherein the invention differs from the prior art.

Further advantages will appear in the following description of the operational characteristics of the device described to demonstrate the invention.

In the above description of the shift from "low" to "high," if the oil pressure in space D plus the centrifugal pressure to the valve plate 35 radius is sufficient to overcome the centrifugal pressure alone in spaces A and B, the shift is accomplished without help from bleed holes 49. The centrifugal head in each, operates to maintain clutch engagement.

In operation, the barrel valve V of Fig. 1 is ordinarily placed in the low speed ratio position, for initial drive. It will be noted that this valve does not have a "neutral" position, but is set to deliver pressure from pump line 50 to one or the other of feed lines 55 or 56.

When starting the aircraft engine, since the pump P does not deliver pressure at once, but only after the engine has reached a predetermined speed, there is no fluid pressure operative upon either of the high or low speed clutches, so that the initial drag of the supercharger does not put a load on the starting means. If it be desirable to idle the engine, after starting, without subjecting it to the supercharger load, a separate valve V' may be put between the pump and valve V, to cut off the feed to the whole clutch actuator system.

Assuming the engine ready to operate, the valve V being in low ratio position, pump port 51 is open and feed to the low speed port 53, and feed to the low speed clutch is had thru line 55, passages 13, 8, 5 and 48 to the cylinder space to the left of web 2a. The pressure compresses web 30 of the cylinder 29 against piece 36 to load the clutch plate stack 16, 17 and power from shaft 1 is delivered to gear 20 and from gear 24 to supercharger shaft 25.

The external fluid pressure supply is provided by pump P driven by the engine, drawing from the sump and cooler system (not shown) and feeding thru conduit 50 to port 51 of control valve V, as indicated in Fig. 1.

The valve body 101 has a cylindrical bore 102 in which barrel valve V is fitted. The barrel valve member is of 2-port type, coacting with four portings in the body 101. Diametrically opposite feed port 51 is exhaust port 52, and the 90-degree plane thereto, are the two delivery ports 53 and 54, connected respectively to the low and high speed ratio pressure delivery lines 55 and 56, which are connected to gland passages 12 and 13.

Valve V has an external arm W connected to rod X which is operator-operated between the two positions indicated, "low" and "high." As shown in Fig. 1 the feed line 50 is connected to delivery port 51 and line 55, to actuate the low speed clutch 16—17 and drive the blower shaft 25 at the lower of the two speed ratios.

Motion of rod X and arm W rightwise will cause the boss Y of valve V to block the feed port 51 simultaneously with blocking of exhaust port 52, continuation of this motion connecting the low speed delivery port 53 to exhaust at 52, and the high speed ratio delivery port 54 to the feed port 51, for shifting from low to high speed clutch operation.

For certain types of alternate clutch operation it is often desirable to use the valve dwell point when the fluid pressure in the actuating system is static, for obtaining a special soft-shift effect, relying on normal leakages to diminish the torque capacity of the clutch that has been driving while the operator slightly cracks the feed porting beyond the dwell point, for building up the capacity of the other clutch slowly.

In the present instance, where the mechanism is required to operate at high speed under considerable torque, it is more desirable to shift the actuating pressure rapidly, so as to shorten the no-torque interval. In the present demonstration of the invention, it is possible to rock the valve V as fast as the operator desires, without abuse of the clutch plates.

In Fig. 1, the clutch loading cylinder 29 is shown to the left of its mid-position, biased toward the low-speed actuation point. The plates 16, 17 are pressure flattened, and the cylinder 29 has almost reached the end of its travel. This is the status of the mechanism shortly after the valve V has been shifted to "low."

During this shift the self-spring action of plates 16'—17' has exerted a leftward thrust on cylinder 29 as soon as the high speed delivery port 54 is shut off and exhaust port 52 is opened to 54 and the delivery of pressure to the low speed port 53 and passages 55, 13, 8, 5 and 48 has augmented the leftward travel of actuator cylinder 29. The fluid which had been under pressure in space D was expressed thru passages 47, 6 and 12 to line 56, port 54, thru the valve slot to the left of boss Y, and out port 52 to the sump. The fluid which had been trapped in space C thereupon sought relief as cylinder 29 started to move left, and has been partially relieved thru bleed hole 49.

The admission of oil pressure to the high speed cylinder spaces C, D thru passages 47, 6, 7, 12 and 56 the collar 35 initially prevents the application of such pressure in the outer radial space C until the motion of cylinder 29 to the right has been sufficient to apply a loading force on the sludge valve 37. As this piece 37 is moved to the right, the drilled holes 44 can no longer permit release of the oil because of the tight fit of the ground surfaces of cylinder 29 and piece 37. Eventually the outer cylinder space C of the high speed clutch is filled.

During this operation, the low speed cylinder spaces A and B are being emptied since the passages 48, 5, 8, 13 and 55 are connected to exhaust by the valve V of Fig. 1. A portion of the oil which had been in the low speed clutch cylinder spaces A, B, is forced back thru passages 48, 5, 8, 13 and 55 by the rightward travel of cylinder 29; however since collar 34 restricts the connection of B to the outer low speed clutch cylinder space A, the oil so trapped in A is forced out of the holes 39 in cylinder 29, as the piece 36 drifts away from its seat.

It seems worthwhile to further emphasize the peculiar advantage of dividing the working oil body into one portion which is subjected to a high energy ejection action from the peripheral zones as distinct from the action of the other oil body portion in being relieved or vented thru the enumerated passages. The constant outflow characteristic is one feature in the high-energy rejection action, but it is augmented by the additional de-sludging venting which is superimposed thereon, and which occurs at each cyclic shift of drive ratio by the mechanism. In practise, the device of the present demonstration is freed of sludge constantly and is therefore specially adapted to supercharger and similar high speed drive mechanisms required to provide long-continued operation without disassembly.

The showing of Fig. 6 is a plane view and section of a formed clutch plate such as 16 of Fig. 1. The plate is made from a flat steel disc faced on both sides with sintered bronze or its equivalent. The bronze faces are spirally grooved, each being clockwise cut, the grooves being of half-round section, with the face intersections left sharp. The toothed cuts on the inner circumference provide a match for the splines 14a and 15a of the driving drums 14 and 15.

The mating steel driven plates 17 and 17' are square-toothed on their outer periphery to fit the internal teeth 20a and 21a of the gearbodies 20 and 21, and are coned as indicated to provide spring action as well as a radially-moving contact load zone during engagement and release. This general type of clutch construction is shown and explained in detail in Letters Patent U. S. 2,380,680 to Earl A. Thompson issued July 31, 1945. The actuator system disclosed as a part of the present invention for operating two of these clutches on a mutually exclusive driving basis is believed to present points of novelty not disclosed in the prior art, as outlined above.

It will be understood from the foregoing that the alternate shifting of cylinder 29 occurs with time delay during each engaging action and that adequate flushing of oil otherwise trapped in the clutch spaces A, B, C and D is facilitated. There is seldom a time in the operation that any of the clutch cylinder spaces A, B, C or D is not having its oil changed, or is subject to the action of a moving body of oil. The avoidance of oil trapping and of centrifuge gathering of sludge is an important useful result of the invention. Of course when low speed is engaged, there is no oil in space D, therefore the oil body is not circulating thru it during that interval.

The determination of the factors which establish the exact timing action for the shifting of clutch actuation from one clutch to the other, apart from the simple linear movement of the actuator cylinder 29, is obviously a design matter, since the pumping capacity of pump P, the delivery capacity of the connecting channels and passages, the clutch cylinder volumes and the required load capacity of the clutches for sustaining the load of shaft 25 for different engine speeds and flight conditions, all enter in, in addition to such refinements as net clutch plate area, coefficient of friction, and net plate compression with respect to loading cylinder travel.

In the above-presented disclosure and example, it is believed that one generally skilled in the art by following the instructions set forth may readily reproduce the novel and useful combinations described having among others, these advantages; quiet and efficient delivery of torque at selected high speed ratios both greater than 1-to-1, fluid pressure actuation subject to manual selection by direct-shift valving without inter-ratio dwell, controlled timing of the shift by which after manual initiation, the system provides proper dwell or delay for relieving one clutch fluid pressure capacity load while building up the capacity load of the other mutually exclusively, special segregation of a portion of the clutch actuating oil body and special means for expediting relief of same for riddance of sludge, constant flushing flow by the clutch actuator oil body of the clutch actuator cylinder spaces, division of the clutch actuator spaces for better handling of the oil body, and the provision of cross-connection bleed means between alternately actuable fluid pressure clutch cylinders for constant flushing action.

While the invention herein is described in one specific embodiment, it will be clear to those skilled in the art who understand the teachings set forth herein, that various modifications may be made therein without departing from the spirit or scope thereof, and it is contemplated that such modifications shall be covered as set forth in the appended claims; wherein I claim:

1. In a drive combination embodying a pair of alternately actuable friction clutches each having a plurality of multiple disc friction elements, a fluid pressure supply system arranged to deliver actuating fluid pressure to said clutches including a pump, valving operative to control the delivery of said pump, said valving including a regulator valve adjacent said pump operable to maintain a level pressure in said system when said pump is operating, a manually operable valve movable to interrupt positively the delivery of pump pressure of said system to said clutches, a selector valve for directing the said pressure to actuate one or the other of said clutches; a pair of fluid pressure actuator chambers, an actuator member within which said chambers are formed and adapted to engage said clutches, and cross-connecting fluid pressure passages between said chambers contained within said actuator, said passages being operative to deliver a measured volume of fluid from one chamber being actuated by the said supply pressure thereby providing fluid flushing for the other chamber, when said selector valve is moved to direct the said pressure to cause actuation of one of said clutches.

2. In a step ratio drive having a pair of axially separated friction clutches each adapted to couple a drive shaft and a driven shaft thru gearing, and having reciprocable actuator means for said clutches embodying an externally located, axially-movable cylinder member spanning a centrally located piston so as to form end-located pressure chambers, an arrangement of said member embodying terminal radial webs for transmitting compression force to one or the other of said clutches, the spaces within said chambers being provided with fluid pressure supply passages delivering fluid under pressure to reciprocate said cylinder member, relief ports for said chambers located radially of said webs, and slidable relief valves consisting of axially movable plates, located endwise externally of said webs for permitting relief of fluid pressure when the adjacent web thereto is not compressing the clutch at that end of the assembly.

3. In the combination set forth in claim 2, the sub-combination of said relief valves being formed with radially extending faces lying between said webs and said clutches such that the force of compression applied to either clutch by said actuator webs is transmitted thru the structure of one of said relief valves.

4. In a power transmission drive train of the type having a rotatable drive shaft, a parallel driven shaft, a pair of driven gears fixed to and spaced apart on said latter shaft, and having a pair of driving gears meshing with said driven gears and mounted to rotate concentrically with said drive shaft; a pair of clutch plate compartments, spaced-apart clutch driving drums axially located to register with said compartments, a set of clutch plates located within each compartment and adapted to transmit torque from said drums, the combination of a reciprocable actuator adapted to compress each set of said clutch plates alternatively and having a mid-position in which neither set is actuated, fluid pressure means to reciprocate said actuator consisting of a piston member fixed against axial motion to form with said actuator a pair of laterally disposed fluid actuator chambers, and dividing members fixed to either side of said piston member extending axially and co-acting with cylindrical surfaces formed within said actuator to divide said chambers into radially outward and inward sub-chambers said dividing members providing restriction to free radial passage between either pair of outward and inward sub-chambers so formed.

5. In a drive device of the type comprising an engine-driven shaft, a supercharger, a driving shaft for said supercharger, overspeed drive-transmitting mechanism adapted to couple said shafts at one or another step-speed-ratio consisting of driven gears fixed to said supercharger shaft, and having meshing driving gears rotatable and concentric with said first named shaft; a combination arrangement embodying clutch driving drums rotatable with a driving shaft, clutch driven elements formed within a pair of driven gears, mating sets of clutch plates for said elements located within said driven gears and adapted to be compressed axially in opposite directions for coupling said drums alternately with said driven gears, a piston member fixed to said first named shaft and located centrally between said sets of plates and said gears, a cylinder member surrounding said piston member adapted to move axially thereover for compressing one or the other sets of clutch plates and arranged to release one set while initially compressing the other set of clutch plates, a pair of fluid pressure actuator chambers formed inside said cylinder member and separated by said piston member, pump supply means and control valving for directing the fluid pressure provided by said pump supply means to one or the other of said clutch actuator chambers, and flow control means operative to delay the full actuation by the body of fluid directed by said valving to each chamber for providing a timing dwell interval during which the rate of fluid release from the chamber being evacuated is regulated.

6. The combination of a friction clutch adapted to couple a driving shaft and a driven shaft consisting of mating sets of clutch plates keyed respectively to said shafts, an axially fixed piston attached to said driving shaft, a slidable cylinder member surrounding said piston and having a radial web portion for compressing said plates, supply passages for delivering actuation fluid pressure to the space between said piston and cylinder member, radial vents in said cylinder member and pressure relief baffles for controlling the pressure of said space effective to divide the body of fluid in said space into two portions the inner one of which may drain back thru said supply passages and the other portion of which is controlled by said relief baffles to exhaust thru said radial vents.

7. In the combination set forth in claim 6, the subcombination of said baffles consisting of auxiliary piston means dividing said space into inner and outer radial spaces so as to provide a restriction against free flow between said outer and inner spaces.

8. In a power transmitting device of the type having a driving shaft, a driven shaft, driving and driven elements rotating with said shafts, gearing adapted to couple said shafts and adapted to couple them thru a pair of multiple disc clutches spaced apart on said driving shaft; an arrangement which includes two such multiple disc clutches, each of said clutches including a backing web, a replaceable backing plate, driving and driven elements and including a plurality of mating discs alternately inwardly and outwardly toothed for drive-connection with said driving and driven elements, said discs being arranged in a set for each clutch comprising flat driving plates having non-ferrous wear faces alternating with coned steel plates axially yielding a predetermined distance to provide quick release action, a common, axially-movable, compression-applying member for loading both said sets of plates and adapted to move them thru a range of travel such as to flatten the coned steel plates of one clutch assembly at one limit of axial motion and to flatten the coned steel plates of the other assembly at the opposite extreme of motion; a fixed piston-like member enclosed within said compression-applying member and coacting with same such that the latter member moves over the first-named member as a hollow, fluid-enclosing cylinder, and fluid pressure control valving adapted to direct fluid under pressure to either side of said piston-like member for causing axial motion of the said compression-applying member for shifting same thru said range of travel.

9. In the combination set forth in claim 8, the subcombination of said pressure-applying member having radial webs and forming a cylinder, of said fixed piston-like member being attached to said driving shaft and dividing the interior of said member into two fluid-pressure actuator chambers, located on either side of said piston-like member, of vents located radially of said member in each chamber, and of radial spacer members located endwise between said cylinder webs and said sets of discs adapted to close said vents when said actuator member is compressing one of said clutches and to open said vents when the said actuating member releases that one of said clutches.

10. In power clutch devices of the type embodying servo actuators and disc clutch elements adapted to provide clutch drive sustained by fluid pressure, the combination of an actuator mechanism which includes an axially shiftable fluid-pressure operated cylinder having radial end webs for alternately loading disc clutch elements located at either end of the zone of axial motion of said cylinder, of relief ports in said cylinder, of fluid pressure supply connections leading to the interior of said cylinder and of radially extending slidable valves located at either end of said cylinder operative to respond to the axial motion of said cylinder for alternately relieving or blocking relief of pressure from within the said cylinder by said relief ports.

11. In a high speed clutch mechanism for alternate coupling of a power shaft and a load shaft at one of two geared speed ratios both in excess of 1-to-1 ratio, fluid pressure operated apparatus effective to establish said alternate coupling by said clutch mechanism by fluid pressure actuation thereof, a movable control selector for said apparatus operative to direct fluid pressure thereto for said alternate coupling action, a fluid pressure responsive device operable to remove sludge from said fluid and to deliver sludge-free fluid to said apparatus, said device including a fluid pressure responsive valve and a centrifugal trap located in a rotating portion of said mechanism from which said sludge is ejected during predetermined operational movement of said selector.

CHESTER E. HOCKERT.

REFERENCES CITED

The following references are of record in the file of this patent:

UNITED STATES PATENTS

| Number | Name | Date |
|---|---|---|
| 857,393 | Hagman | June 18, 1907 |
| 1,138,098 | Formaca | May 4, 1915 |
| 1,351,597 | Wingfield | Aug. 31, 1920 |
| 1,394,952 | Swanson | Oct. 25, 1921 |
| 1,929,185 | Ferris | Oct. 3, 1933 |
| 2,068,062 | Metten | Jan. 19, 1937 |
| 2,170,538 | Sarver | Aug. 22, 1939 |
| 2,200,071 | Arnold | May 7, 1940 |
| 2,245,857 | Hale | June 17, 1941 |
| 2,298,645 | Jackes, Jr. | Oct. 13, 1942 |
| 2,330,024 | Beardsley | Sept. 21, 1943 |
| 2,430,799 | Aspinwall | Nov. 11, 1947 |

FOREIGN PATENTS

| Number | Country | Date |
|---|---|---|
| 420,485 | Germany | Oct. 24, 1925 |
| 465,612 | Great Britain | May 10, 1937 |